US011353930B2

(12) United States Patent
Chen et al.

(10) Patent No.: US 11,353,930 B2
(45) Date of Patent: Jun. 7, 2022

(54) HINGES WITH MAGNETS

(71) Applicant: Hewlett-Packard Development Company, L.P., Spring, TX (US)

(72) Inventors: Wei-Chung Chen, Taipei (TW); Kuan-Ting Wu, Taipei (TW); Kun-Hung Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 250 days.

(21) Appl. No.: 16/646,022

(22) PCT Filed: Oct. 9, 2017

(86) PCT No.: PCT/US2017/055750
§ 371 (c)(1),
(2) Date: Mar. 10, 2020

(87) PCT Pub. No.: WO2019/074477
PCT Pub. Date: Apr. 18, 2019

(65) Prior Publication Data
US 2020/0278723 A1   Sep. 3, 2020

(51) Int. Cl.
*G06F 1/16*      (2006.01)
*E05D 3/02*      (2006.01)
*E05D 11/10*     (2006.01)

(52) U.S. Cl.
CPC .............. *G06F 1/1681* (2013.01); *E05D 3/02* (2013.01); *E05D 11/105* (2013.01); *E05Y 2201/222* (2013.01); *E05Y 2201/246* (2013.01); *E05Y 2201/258* (2013.01); *E05Y 2201/46* (2013.01); *E05Y 2900/606* (2013.01)

(58) Field of Classification Search
CPC combination set(s) only.
See application file for complete search history.

(56) References Cited

U.S. PATENT DOCUMENTS

| 8,413,302 | B2 | 4/2013 | Kitagawa et al. |
| 9,207,712 | B1 | 12/2015 | McAlpine et al. |
| 9,310,835 | B2 | 4/2016 | Bryan et al. |
| 9,529,390 | B2 | 12/2016 | Tseng et al. |
| 9,740,238 | B2 | 8/2017 | Han |

(Continued)

FOREIGN PATENT DOCUMENTS

| CN | 105569479 B | 5/2016 |
| TW | 201329358 B | 7/2013 |
| WO | WO-2014084818 A1 | 6/2014 |

OTHER PUBLICATIONS

Vieira, J., Lenovo Yoga Tablet 2 (10-inch), Apr. 2, 2015, http://www.portugal-tech.pt/showthread.php?t=2730.

*Primary Examiner* — Lisa Lea-Edmonds
(74) *Attorney, Agent, or Firm* — Brooks Cameron & Huebsch PLLC (57) ABSTRACT

Examples herein relate to a hinge. In some examples, a hinge can include a first bracket connected to a shaft, a second bracket connected to the first bracket, a member connected to the shaft and magnetically attracted to a magnet at a first position, where the member translates relative to the magnet to a second position as the shaft rotates about an axis of the shaft, and the magnet to generate a magnetic attraction force between the member and the magnet, where the magnetic attraction force is higher at the second position than the first position.

15 Claims, 5 Drawing Sheets

(56) References Cited

U.S. PATENT DOCUMENTS

| | | | |
|---|---|---|---|
| 9,840,861 B1* | 12/2017 | Määttä | H04M 1/0216 |
| 10,725,505 B1* | 7/2020 | Hallar | E05D 7/00 |
| 10,852,765 B2* | 12/2020 | Sanchez | E05F 1/1223 |
| 10,852,776 B1* | 12/2020 | Morrison | E05D 11/1028 |
| 10,928,864 B1* | 2/2021 | Sanchez | G06F 1/1681 |
| 11,016,539 B2* | 5/2021 | Hallar | G06F 1/1618 |
| 11,016,540 B2* | 5/2021 | Hallar | G06F 1/1618 |
| 11,061,444 B2* | 7/2021 | Nakamura | G06F 1/162 |
| 11,093,008 B2* | 8/2021 | Hallar | E05D 11/1028 |
| 11,099,611 B2* | 8/2021 | Hallar | G06F 1/1618 |
| 11,169,575 B2* | 11/2021 | Elsey | G06F 1/1681 |
| 11,216,042 B2* | 1/2022 | Kanas | G06F 1/1618 |
| 2011/0010893 A1 | 1/2011 | Su | |
| 2017/0068283 A1 | 3/2017 | Liang et al. | |
| 2021/0247816 A1* | 8/2021 | Hallar | G06F 1/1616 |
| 2021/0247817 A1* | 8/2021 | Hallar | G06F 1/1616 |
| 2021/0294388 A1* | 9/2021 | Chen | G06F 1/1679 |
| 2021/0405711 A1* | 12/2021 | Morrison | F16C 11/10 |

\* cited by examiner

HINGES WITH MAGNETS

BACKGROUND

Electronic devices may include a display. A display can present images, text, and/or video electronically to a user. A user may give an input to the electronic device via the touch screen display. The display may be oriented in a manner to allow a user to easily view display. In some examples, the electronic device may include a display that can be opened or closed via a hinge. In some examples, the electronic device may include a stand that can be opened or closed via a hinge that can allow the electronic device to be kept upright without leaning against another object.

DETAILED DESCRIPTION

Electronic devices may include a display. An electronic device may include rotatable components to view the display at various angles. For example, a user may prefer a display oriented at a certain angle over other angles. As used herein, the term "display" can, for example, refer to a device which can provide information to a user and/or receive information from a user. For instance, a display can include a graphical user interface (GUI) that can provide and/or receive information to and/or from a user.

Electronic devices including rotatable components may include a hinge. For instance, facilitating rotation of the rotatable components to allow the display to be viewed at various angles can be accomplished by a hinge. As used herein, the term "hinge" can, for example, refer to a mechanical connection that connects two objects such that the two objects can rotate relative to each other by an angle of rotation about a fixed axis of rotation. For example, a display of a computing device can be rotated such that the display may be viewed at various angles.

Electronic devices including touch screen displays may experience a force in response to a user input to the display. For example, a user may touch the display in order to provide an input to the computing device, and the display experiences a force as a result of the user touching the display. The display may rotate by an angle of rotation as a result of the user touching the display. In some examples, the rotation of the display as a result of the user touching the display can cause the display to rotate to an angle at which a user may not prefer. Therefore, a user may have to rotate the display back to an angle at which the user prefers. In some examples, in order to prevent the display from rotating, a user may not touch the display with force to cause the input to the display to be received by the display, resulting in the display not receiving the input.

Accordingly, the disclosure is directed to a hinge. The hinge can provide variable torque as the hinge is operated. In various examples according to the disclosure, the hinge having variable torque can resist rotation when a user touches a display. By resisting rotation, the hinge can maintain an angle at which a user wishes.

Figure 1:
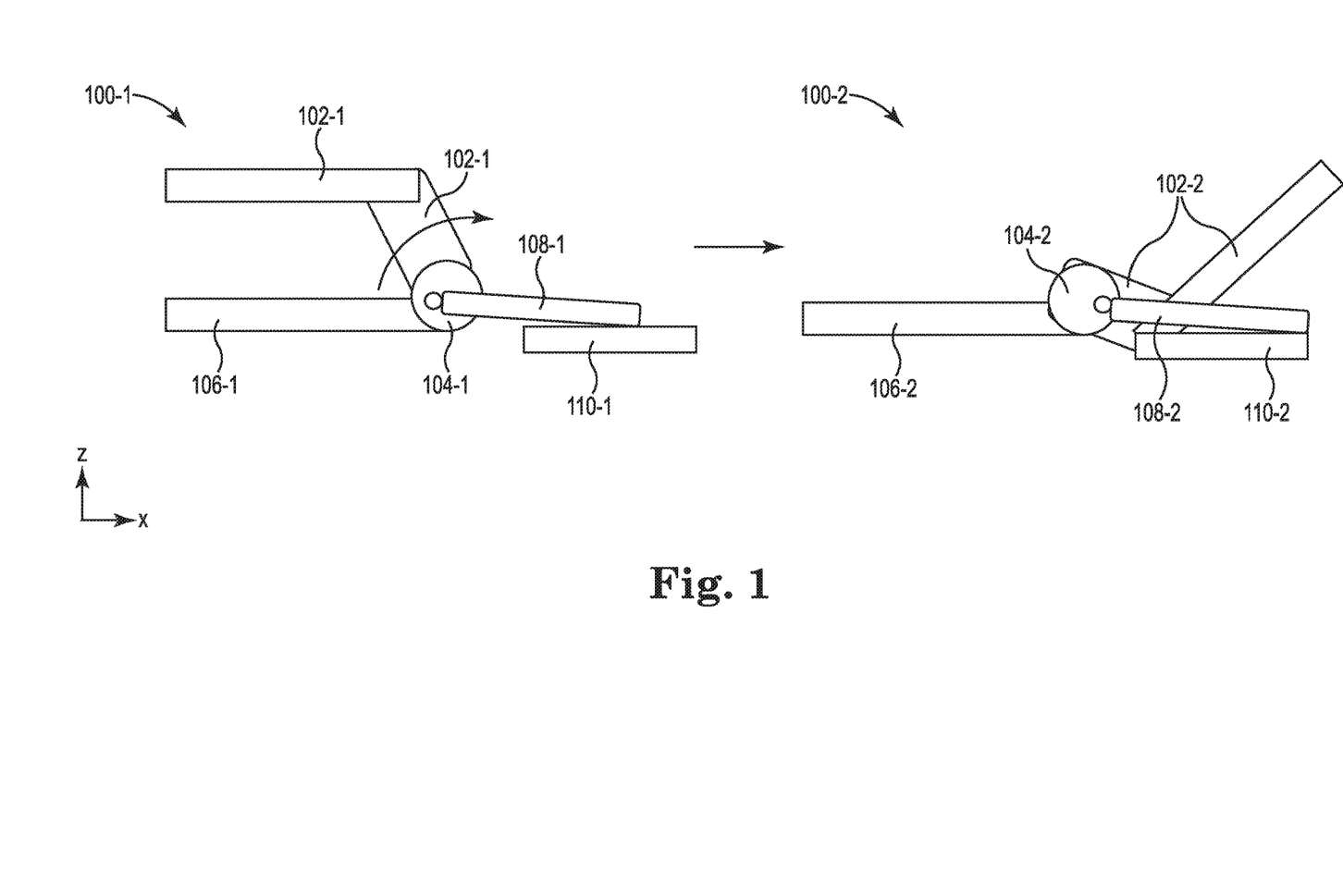
FIG. 1 illustrates a side view of an example of a hinge consistent with the disclosure.

FIG. 1 illustrates a side view of an example of a hinge 100 consistent with the disclosure. Hinge 100 can include first bracket 102, shaft 104, second bracket 106, member 108, and magnet 110.

As illustrated in FIG. 1, the hinge 100 can be oriented in an x-z coordinate plane. For example, the x coordinate as shown in FIG. 1 can be a length and the z coordinate as shown in FIG. 1 can be a height. As indicated by the coordinate system shown in FIG. 1, a positive x-direction can refer to a direction toward the right of the page, and a positive z-direction can refer to a direction toward the top of the page. A negative x-direction can refer to a direction toward the left of the page, and a negative z-direction can refer to a direction toward the bottom of the page.

As illustrated in FIG. 1; hinge 100-1 illustrates a hinge at a first angle of rotation, and hinge 100-2 illustrates the hinge at a second angle of rotation. Hinge 100 rotates from the first angle of rotation to the second rotation about shaft 104 in a clockwise direction as indicated in FIG. 1.

Hinge 100 can include a first bracket 102. As used herein, the term "bracket" can, for example, refer to a support object to connect to and/or support a different object. First bracket 102 can be connected to shaft 104. As used herein, the term "shaft" can; for example; refer to a cylindrical object such as a pole. First bracket 102 can be connected to a rotating element of a computing device, such as a display of a computing device, as is further described in connection with FIG. 4.

Hinge 100 can include a second bracket 106. Second bracket 106 can be connected to the first bracket 102. Second bracket 106 can remain static when first bracket 102 and shaft 104 are rotated. For example, first bracket 102 and shaft 104 can rotate relative to second bracket 106. Second bracket 106 can be connected to a housing of a computing device, as is further described in connection with FIG. 4.

Hinge 100 can include a member 108. As used herein, the term "member" can, for example, refer to a constituent part of a device. Member 108 can be a material that is attracted to a magnet. For example, member 108 can be a ferromagnetic or ferrimagnetic material. For example, member 108 can be a material such as cobalt, iron, nickel, iron oxide, and/or any other magnetic materials, alloys, and/or other combinations of materials.

Member 108 can be magnetically attracted to magnet 110. As used herein, the term "magnet" can, for example, refer to an object of a material that produces a magnetic field. For example, magnet 110 can be iron, nickel, a nickel-iron alloy such as Mu-metal, and/or any other magnetic materials, composites, rare-earth magnets, other magnetic alloys, and/or other combinations of materials.

Member 108-1 can be magnetically attracted to magnet 110-1 at a first position. For example, member 108-1 is at a first position and can be magnetically attracted to magnet 110-1 by a magnetic attraction force at the first position of member 108-1. As used herein, the term "magnetic attraction force" can, for example, refer to an attraction force arising between electrically charged particles.

Member 108-1 can translate relative to magnet 110-1 to a second position as shaft 104-1 rotates about an axis of shaft 104-1. For example, first bracket 102-1 and shaft 104-1 can rotate to cause member 108-1 to move in a translational motion in a positive x-direction. Member 108-1 can translate to a second position, as shown in FIG. 1 by member 108-2.

First bracket 102-1 and shaft 104-1 can rotate relative to second bracket 106-1 about an axis of shaft 104-1. For example, first bracket 102-1 and shaft 104-1 can rotate from a first rotation angle as illustrated in FIG. 1 by first bracket 102-1 and shaft 104-1 to a second rotation angle as illustrated in FIG. 1 by first bracket 102-2 and shaft 104-2. Second bracket 106 can stay in the same position as first bracket 102 and shaft 104 rotate, as illustrated in FIG. 1 by second bracket 106-1 and 106-2.

Magnet 110 can generate a magnetic attraction force between member 108 and magnet 110. For example, as a result of member 108 being a material that is attracted to magnets, and magnet 110 being a magnet, member 108 may be attracted to magnet 110.

Although described above as member 108 being a material that is attracted to magnets, examples of the disclosure are not so limited. In some examples, member 108 may be a magnet.

As described above, a magnetic attraction force may be generated between member 108 and magnet 110. For example, a first magnetic force may be generated between member 108-1 and magnet 110-1 when member 108-1 is at the first position. As a result of first bracket 102 and shaft 104 rotating, member 108 may move to a second position relative to magnet 110. For example, a magnetic attraction force may be generated between member 108-2 and magnet 110-2 when member 108-2 is at the second position.

The magnetic attraction force may be higher at the second position than the first position. For example, the magnetic attraction force generated between member 108-2 and magnet 110-2 (e.g., when the member 108-2 is at the second position) can be higher than the magnetic attraction force generated between member 108-1 and magnet 110-1 (e.g., when the member 108-1 is at the first position).

The magnetic attraction force between member 108 and magnet 110 can increase as the translational motion of the member 108 relative to magnet 110 occurs in response to the rotation of the first bracket 102 and shaft 104. For example, as first bracket 102-1 and shaft 104-1 rotate from the first rotation angle to the second rotation angle (e.g., as illustrated by first bracket 102-2 and shaft 104-2), the magnetic attraction force between member 108 and magnet 110 increases.

As a result of the magnetic attraction force being higher at the second position than the first position, a stronger force may be used in order to create an amount of torque in order to rotate first bracket 102-2 than is used in order to rotate first bracket 102-1. For example, the first rotation angle can be zero degrees, as illustrated by first bracket 102-1. The second rotation angle can be 140 degrees, as illustrated by first bracket 102-2. A higher force can be used at the second rotation angle in order to cause first bracket 102 to rotate than a force used at the first rotation angle to cause first bracket 102 to rotate as a result of the higher magnetic attraction force at the second position of member 108-2 than the first position of member 108-1.

In some examples, the higher force can resist a display of a computing device from rotating when a user touches the display. Resisting the rotation of the display by hinge 100 can allow for the display to remain at a particular angle while inputs are being provided to the display via a physical touch.

Figure 2:
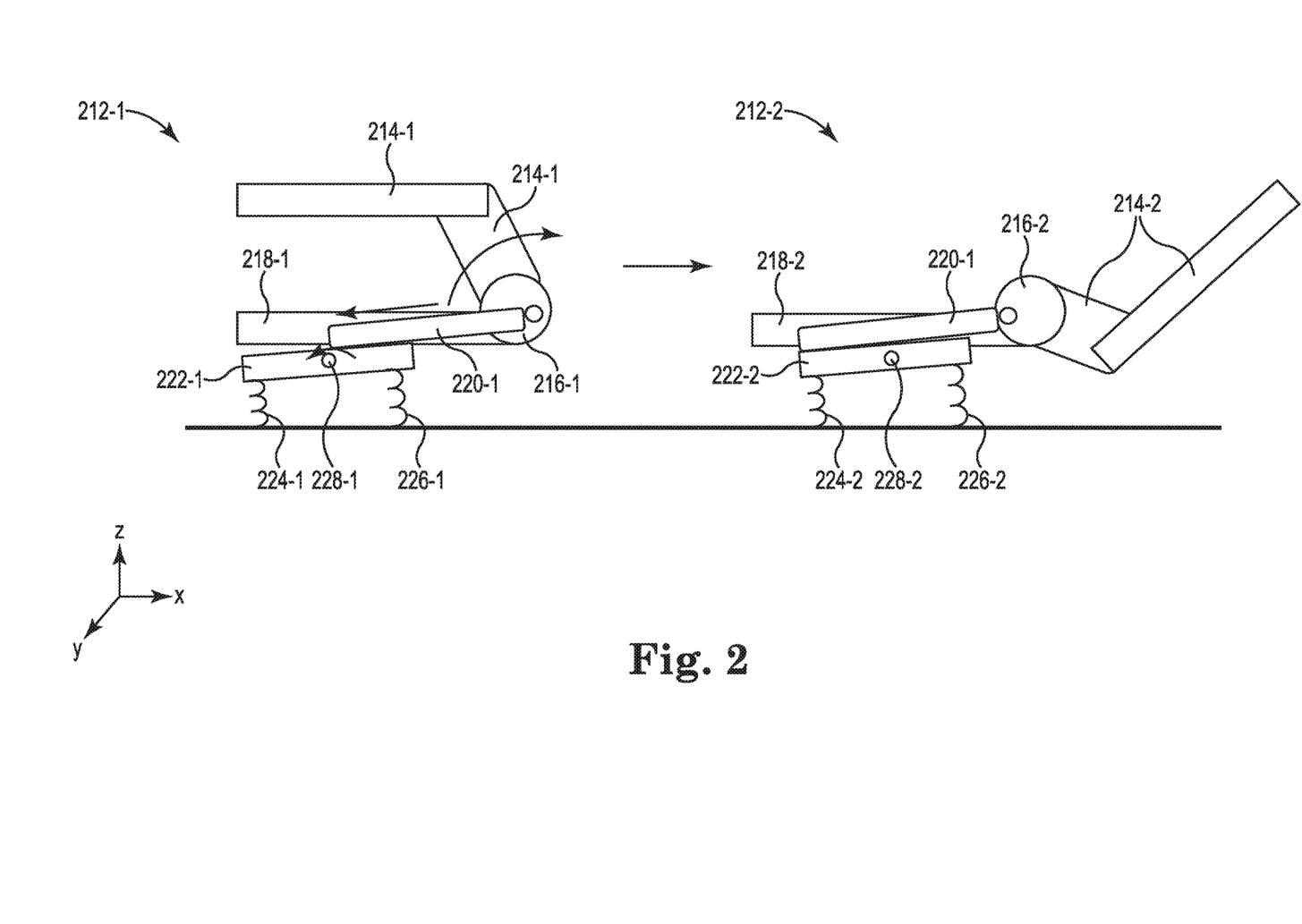
FIG. 2 illustrates a side view of an example of a hinge consistent with the disclosure.

FIG. 2 illustrates a side view of an example of a hinge 212 consistent with the disclosure. Hinge 212 can include first bracket 214, shaft 216, second bracket 218, member 220, magnet 222, and mechanisms 224, 226. Magnet 222 can include pin 228.

As illustrated in FIG. 2, the hinge 212 can be oriented in an x-y-z coordinate plane. For example, the x coordinate as shown in FIG. 2 can be a length, the y coordinate can be a width, and the z coordinate can be a height. As indicated by the coordinate system shown in FIG. 2, a positive x-direction can refer to a direction toward the right of the page, a positive z-direction can refer to a direction toward the top of the page, and a positive y-direction can refer to a direction out of the page. A negative x-direction can refer to a direction toward the left of the page, a negative z-direction can refer to a direction toward the bottom of the page, and negative y-direction can refer to a direction into the page.

As illustrated in FIG. 2, hinge 212-1 illustrates a hinge at a first angle of rotation, and hinge 212-2 illustrates the hinge at a second angle of rotation. Hinge 212 rotates from the first angle of rotation to the second rotation about shaft 216 in a clockwise direction as indicated in FIG. 2.

As illustrated in FIG. 2, hinge 212 can include a first bracket 214. First bracket 214 can be similar to first bracket 102, previously described in connection with FIG. 1. First bracket 214 can be connected to shaft 216. Shaft 216 can be similar to shaft 104, previously described in connection with FIG. 1. First bracket 214 can be connected to a rotating element of a computing device, such as a display of a computing device, as is further described in connection with FIG. 4.

Hinge 212 can include a second bracket 218. Second bracket 218 can be similar to second bracket 106, previously described in connection with FIG. 1. Second bracket 218 can be connected to first bracket 214. Second bracket 218 can remain static when first bracket 214 and shaft 216 are rotated. For example, first bracket 214 and shaft 216 can rotate relative to second bracket 218. Second bracket 218 can be connected to a housing of a computing device, as is further described in connection with FIG. 4.

Hinge 212 can include a member 220. Member 220 can be a material that is magnetically attracted to magnets. Hinge 212 can include magnet 222. For example, member 220-1 can be magnetically attracted to magnet 222-1 at a first position of member 220-1.

Magnet 222 can be located below second bracket 218 as illustrated in FIG. 2. For example, magnet 222 can be located in a negative z-direction relative to second bracket 218. As illustrated in FIG. 2, a negative z-direction can, for example, refer to a direction relative to the bottom of the page as indicated by the coordinate system shown in FIG. 2. For example, the negative z-direction can be a direction toward the bottom of the hinge 212 as illustrated in FIG. 2.

Magnet 222 can be located on a side of second bracket 218. For example, magnet 222 can be located in a positive y-direction relative to second bracket 218.

Member 220-1 can translate relative to magnet 222-1 to a second position as shaft 216-1 rotates about an axis of shaft 216-1 from a first rotation angle to a second rotation angle. For example, first bracket 214-1 and shaft 216-1 can rotate to cause member 220-1 to move in a translational motion in a negative x-direction. Member 220-1 can translate to a second position, as shown in FIG. 2 by member 220-2.

First bracket 214-1 and shaft 216-1 can rotate relative to second bracket 218-1 about an axis of shaft 216-1. For example, first bracket 214-1 and shaft 216-1 can rotate from a first rotation angle as illustrated in FIG. 2 by first bracket 214-1 and shaft 216-1 to a second rotation angle as illustrated in FIG. 2 by first bracket 214-2 and shaft 216-2.

Magnet 222 can include a pin 228 to cause magnet 222 to rotate in response to member 220 translating relative to magnet 222 to the second position. As used herein, the term "pin" can, for example, refer to a shaft around which magnet 222 can rotate. For example, as first bracket 214-1 and shaft 216-1 rotate from the first rotation angle to the second rotation angle causing member 220-1 to translate from the first position to the second position illustrated by member 220-2, magnet 222-1 can rotate as a result of member 220. For example, as member 220 translates from the first position (e.g., member 220-1) to the second position (member 220-2), member 220 can cause a force to be imposed on magnet 222, causing magnet 222 to rotate in a counter-clockwise rotation as illustrated in FIG. 2.

Magnet 222 can be connected to two mechanisms 224 and 226. The two mechanisms 224 and 226 can resist the rotation of magnet 222 about the pin 228 in response to member 220 translating relative to the magnet 222. For example, as member 220-1, at the first position, translates relative to magnet 222 to the second position (e.g., member 220-2), mechanism 224 can resist the rotation of magnet 222-1.

Mechanisms 224 and 226 can, in some examples, be springs. As used herein, the term "spring" can, for example, refer to a mechanical device that stores mechanical energy when the spring is compressed or stretched. For example, a spring can resist the rotation of magnet 222-2 about pin 228-2.

Although mechanisms 224 and 226 are described above as being springs, examples of the disclosure are not so limited. For example, mechanisms 224 and/or 226 can be a mechanical or hydraulic shock absorber, dashpot, and/or other dampening device and/or combination thereof to resist rotation of magnet 222.

Magnet 222 can generate a magnetic attraction force between member 220 and magnet 222. For example, as a result of member 220 being a material that is magnetically attracted to magnets, and magnet 222 being a magnet, member 220 can be attracted to magnet 222.

The magnetic attraction force may be generated between member 220 and magnet 222. For example, a first magnetic force may be generated between member 220-1 and magnet 222-1 when member 220-1 is at the first position. As a result of first bracket 214 and shaft 216 rotating, member 220 may move to a second position relative to magnet 222. For example, a magnetic attraction force may be generated between member 220-2 and magnet 222-2 when member 220-2 is at the second position.

The magnetic attraction force may be higher at the second position than the first position, and can increase as the translational motion of the member 220 relative to magnet 222 occurs in response to the rotation of the first bracket 214 and shaft 216. For example, as member 220 translates from the first position (e.g., member 220-1) to the second position (e.g., member 220-2), the magnetic attraction force between member 220 and magnet 222 can increase such that the magnetic attraction force generated between member 220-2 and magnet 222-2 (e.g., when the member 220-2 is at the second position) can be higher than the magnetic attraction force generated between member 220-1 and magnet 222-1 (e.g., when the member 220-1 is at the first position).

As a result of the magnetic attraction force being higher at the second position than the first position, a stronger force may be used in order to create an amount of torque in order to rotate first bracket 214-2 than is used in order to rotate first bracket 214-1. For example, the first rotation angle can be zero degrees, as illustrated by first bracket 214-1. The second rotation angle can be 140 degrees, as illustrated by first bracket 214-2. A higher force can be used at the second rotation angle in order to cause first bracket 214-2 to rotate than a force used at the first rotation angle to cause first bracket 214-1 to rotate as a result of the higher magnetic attraction force at the second position of member 220-2 than the first position of member 220-1.

Figure 3:
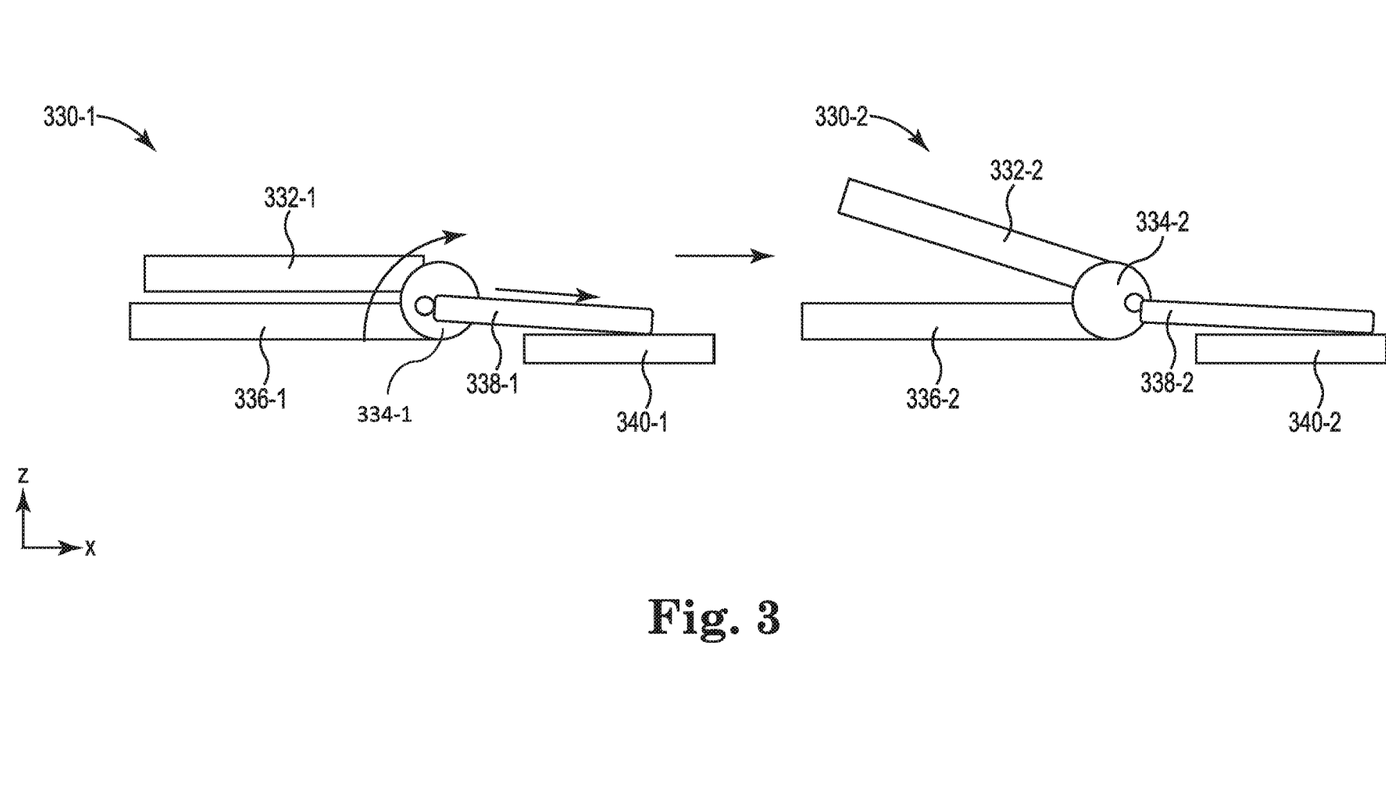
FIG. 3 illustrates a side view of an example of a hinge consistent with the disclosure.

FIG. 3 illustrates a side view of an example of a hinge 330 consistent with the disclosure. Hinge 330 can include first bracket 332, shaft 334, second bracket 336, member 338, and magnet 340.

As illustrated in FIG. 3, the hinge 330 can be oriented in an x-z coordinate plane. For example, the x coordinate as shown in FIG. 3 can be a length and the z coordinate as shown in FIG. 3 can be a height. As indicated by the coordinate system shown in FIG. 3, a positive x-direction can refer to a direction toward the right of the page, and a positive z-direction can refer to a direction toward the top of the page. A negative x-direction can refer to a direction toward the left of the page, and a negative z-direction can refer to a direction toward the bottom of the page.

As illustrated in FIG. 3, hinge 330-1 illustrates a hinge at a first angle of rotation, and hinge 330-2 illustrates the hinge at a second angle of rotation. Hinge 330 rotates from the first angle of rotation to the second rotation about shaft 334 in a clockwise direction as indicated in FIG. 3.

Hinge 330 can include a first bracket 332. First bracket 332 can be connected to shaft 334. First bracket 332 can be connected to a rotating element of a computing device, such as a stand of a computing device, as is further described in connection with FIG. 5.

Hinge 330 can include a second bracket 336. Second bracket 336 can be connected to first bracket 332. Second bracket 336 can remain static when first bracket 332 and shaft 334 are rotated. For example, first bracket 332 and shaft 334 can rotate relative to second bracket 336. Second bracket 336 can be connected to a housing of a computing device, as is further described in connection with FIG. 5.

Hinge 330 can include a member 338. Member 338 can be a material that is magnetically attracted to magnets. Hinge 330 can include magnet 340. For example, member 338-1 can be magnetically attracted to magnet 340-1 at a first position of member 338-1.

Member 338 can be located forward from second bracket 336 and shaft 334. For example, member 338 can be located in a positive x-direction relative to second bracket 336 and shaft 334.

Member 338-1 can translate relative to magnet 340-1 to a second position as shaft 334-1 rotates about an axis of shaft 334-1 from a first rotation angle to a second rotation angle. For example, first bracket 332-1 and shaft 334-1 can rotate to cause member 338-1 to move in a translational motion in a positive x-direction. Member 338-1 can translate to a second position, as shown in FIG. 3 by member 338-2.

First bracket 332-1 and shaft 334-1 can rotate relative to second bracket 336-1 about an axis of shaft 334-1. For example, first bracket 332-1 and shaft 334-1 can rotate from a first rotation angle as illustrated in FIG. 3 by first bracket 332-1 and shaft 334-1 to a second rotation angle as illustrated in FIG. 3 by first bracket 332-2 and shaft 334-2.

Magnet 340 can generate a magnetic attraction force between member 338 and magnet 340. For example, as a result of member 338 being a material that is magnetically attracted to magnets, and magnet 340 being a magnet, member 338 can be attracted to magnet 340.

The magnetic attraction force may be generated between member 338 and magnet 340. For example, a first magnetic force may be generated between member 338-1 and magnet 340-1 when member 338-1 is at the first position. As a result of first bracket 332 and shaft 334 rotating, member 338 may move to a second position relative to magnet 340. For example, a magnetic attraction force may be generated between member 338-2 and magnet 340-2 when member 338-2 is at the second position.

The magnetic attraction force may be higher at the second position than the first position, and can increase as the translational motion of the member 338 relative to magnet 340 occurs in response to the rotation of the first bracket 332 and shaft 334. For example, as member 338 translates from the first position (e.g., member 338-1) to the second position (e.g., member 338-2), the magnetic attraction force between member 338 and magnet 340 can increase such that the magnetic attraction force generated between member 338-2 and magnet 340-2 (e.g., when the member 338-2 is at the second position) can be higher than the magnetic attraction force generated between member 338-1 and magnet 340-1 (e.g., when the member 338-1 is at the first position).

As a result of the magnetic attraction force being higher at the second position than the first position, a stronger force may be used in order to create an amount of torque in order to rotate first bracket 332-2 than is used in order to rotate first bracket 332-1. For example, the first rotation angle can be zero degrees, as illustrated by first bracket 332-1. The second rotation angle can be 30 degrees, as illustrated by first bracket 332-2. A higher force can be used at the second rotation angle in order to cause first bracket 332-2 to rotate than a force used at the first rotation angle to cause first bracket 332-1 to rotate as a result of the higher magnetic attraction force at the second position of member 338-2 than the first position of member 338-1.

Figure 4:
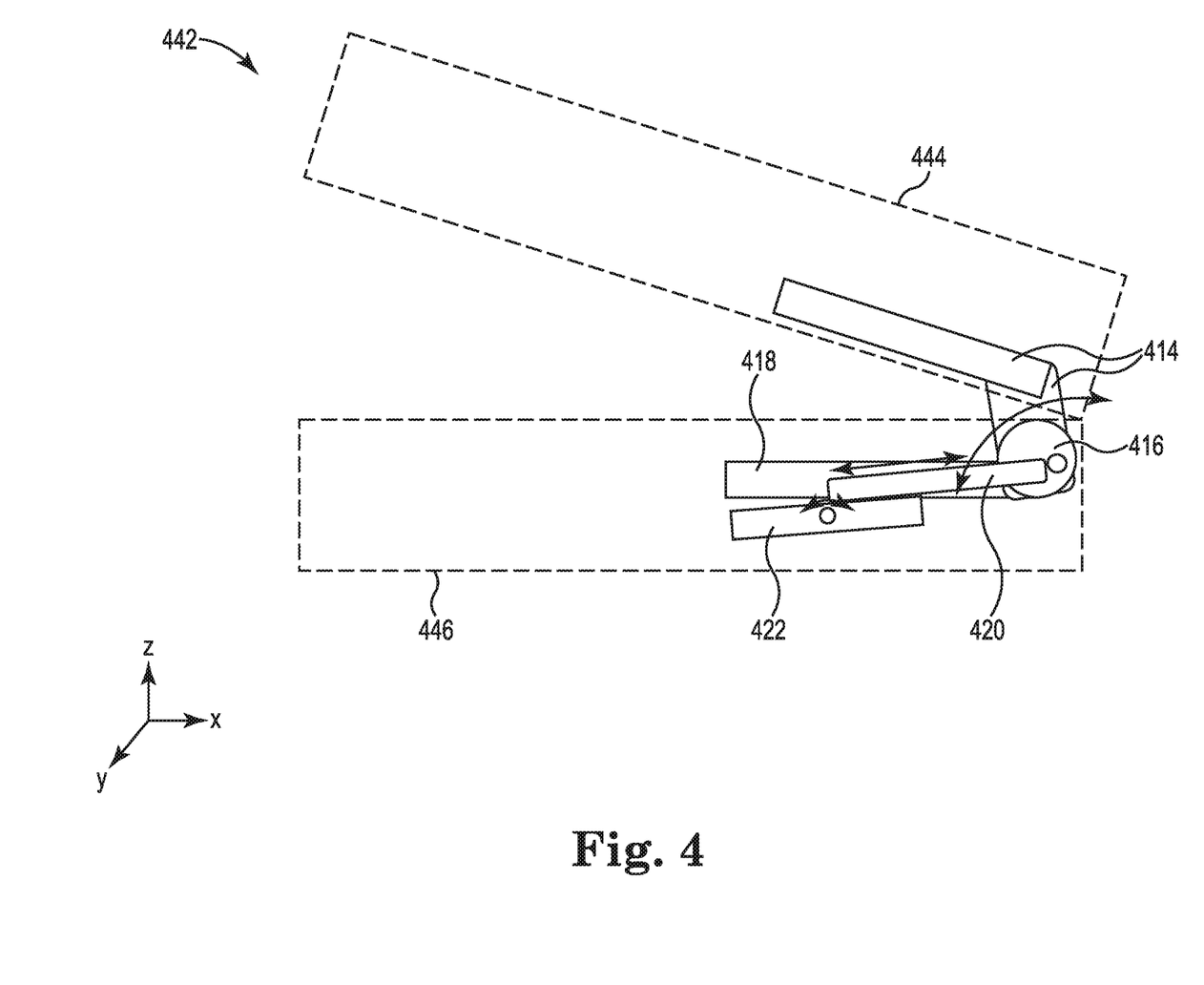
FIG. 4 illustrates a side view of an example of a system including a computing device with a hinge including consistent with the disclosure.

FIG. 4 illustrates a side view of an example of a system 442 including a computing device with a hinge consistent with the disclosure. The computing device can include a housing 446 and a rotating element 444.

As illustrated in FIG. 4, the computing device can be oriented in an x-y-z coordinate plane. For example, the x coordinate as shown in FIG. 4 can be a length, the y coordinate can be a width, and the z coordinate can be a height. As indicated by the coordinate system shown in FIG. 4, a positive x-direction can refer to a direction toward the right of the page, a positive z-direction can refer to a direction toward the top of the page, and a positive y-direction can refer to a direction out of the page. A negative x-direction can refer to a direction toward the left of the page, a negative z-direction can refer to a direction toward the bottom of the page, and negative y-direction can refer to a direction into the page.

The system 442 can include a computing device. The computing device can be, for example, a laptop computer, among other types of computing devices.

The computing device can include a rotating element 444, a housing 446 of the computing device, and can include a hinge connected to the computing device. The rotating element 444 can rotate relative to housing 446 of the computing device via the hinge. For example, rotating element 444 can be rotated relative to housing 446 via the hinge.

In some examples, rotating element 444 can be a display. For example, the display can provide and/or receive information to and/or from a user via a graphical user interface (GUI). In some examples, the display can be a touch screen display to provide and/or receive information from a user. The display can be rotated relative to the housing 446 via the hinge.

The hinge can include first bracket 414. First bracket 414 can be connected to rotating element 444. That is, first bracket 414 can be connected to the display of the computing device. First bracket 414 can be connected to shaft 416.

The hinge can include second bracket 418. The second bracket 418 can be connected to the housing 446 of the computing device.

The hinge can include a member 420. The member 420 can be connected to the shaft 416. The member 420 can be magnetically attracted to a magnet 422.

For example, as illustrated in FIG. 4, the member 420 can be between a first position and a second position relative to the magnet 422. The member 420 can experience a magnetic attraction force at various positions of the member 420, as is further described herein.

The member 420 can translate to a second position of the member 420 relative to the magnet 422 from a first position of the member 420 in response to the first bracket 414 and the shaft 416 rotating about an axis of the shaft 416 from a first rotation angle to a second rotation angle. For example, as rotating element 444 (e.g., the display of the computing device) rotates relative to housing 446 of the computing device, the first bracket 414 and the shaft 416 can correspondingly rotate relative to second bracket 418. In other words, the display of the computing device can rotate relative to housing 446 of the computing device in response to the first bracket 414 and the shaft 416 rotating about the axis of the shaft 416 from a first rotation angle to a second rotation angle. As a result of the rotating element 444 rotating relative to housing 446, the member 420 can translate from a first position to a second position relative to the magnet 422.

As the member 420 translates relative to the magnet (e.g., in a negative x-direction, as illustrated in FIG. 4) from a first position to a second position, the magnetic attraction force between the member 420 and the magnet 422 can increase. For example, as the display of the computing device is opened (e.g., as the rotating element 444 is rotated in a clock-wise direction), the magnetic attraction force between the member 420 and the magnet 422 can increase. As the magnetic attraction force between the member 420 and the magnet 422 increases, the force to continue rotating the rotating element 444 can increase. As a result, in an example in which the display is a touch screen display, the display can receive information from a user without the display rotating as a result of the user touching the display.

The display of the computing device can correspondingly be closed (e.g., as the rotating element 444 is rotated in a counter clock-wise direction), the magnetic attraction force between the member 420 and the magnet 422 can decrease. That is, the magnetic attraction force between the member 420 and the magnet 422 can decrease as the translational motion of the member 420 relative to the magnet 422 occurs in response to the rotation of the first bracket 414 and the shaft 416 from the second rotation angle to the first rotation angle. As the magnetic attraction force between the member 420 and the magnet 422 decreases, the force to continue rotating the rotating element 444 can decrease.

Although not shown in FIG. 4 for clarity and so as not to obscure examples of the disclosure, the computing device can include a second hinge. The second hinge can be located on an opposing side of the computing device. For example, the second hinge can be oriented in a similar manner as the hinge illustrated in FIG. 4, and be located on an opposing side of the computing device in a negative y-direction from the hinge illustrated in FIG. 4.

Figure 5:
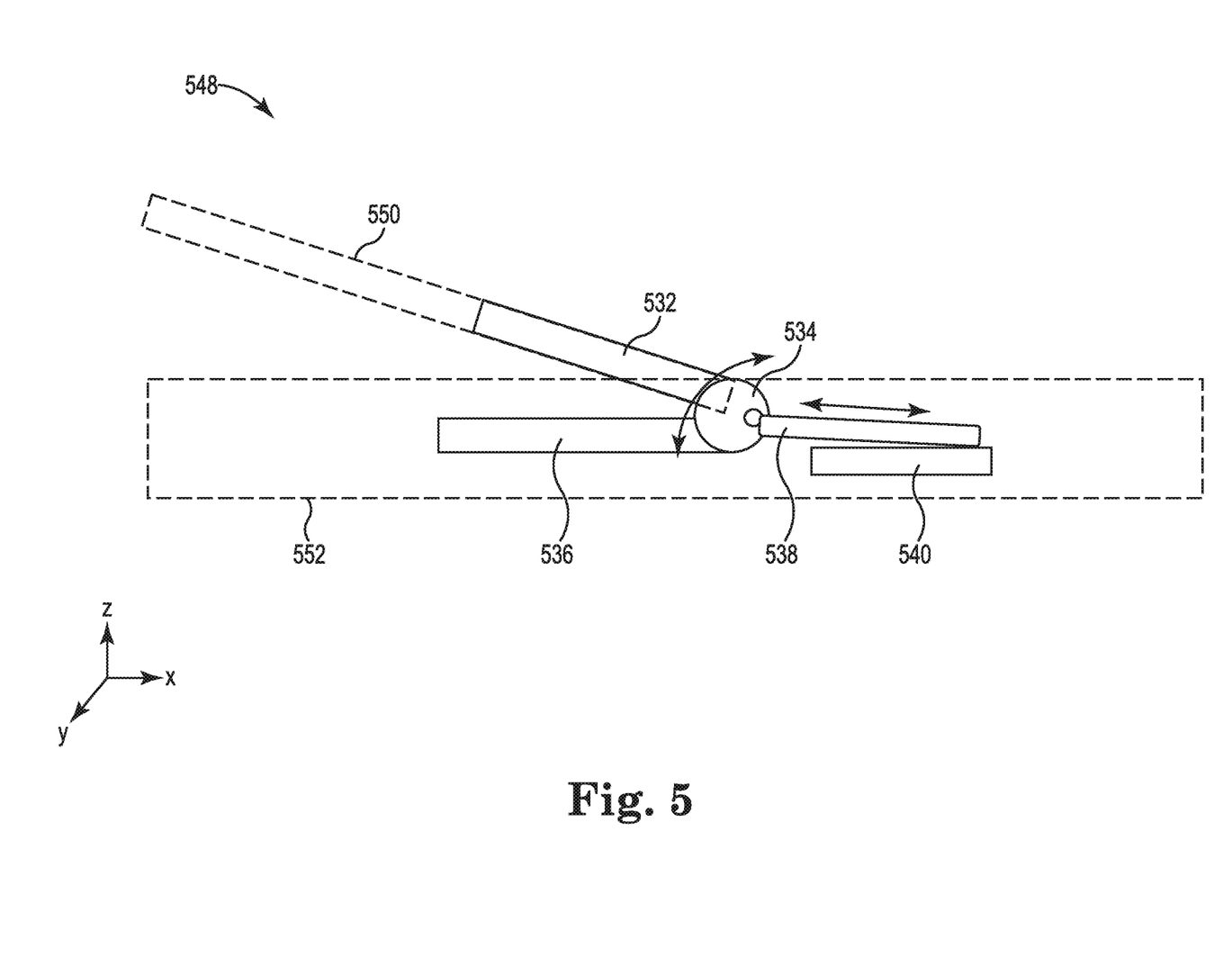
FIG. 5 illustrates a side view of an example of a system including a computing device with a hinge consistent with the disclosure.

FIG. 5 illustrates a side view of an example of a system 548 including a computing device with a hinge consistent with the disclosure.

As illustrated in FIG. 5, the computing device can be oriented in an x-y-z coordinate plane. For example, the x coordinate as shown in FIG. 5 can be a length, the y coordinate can be a width, and the z coordinate can be a height. As indicated by the coordinate system shown in FIG. 5, a positive x-direction can refer to a direction toward the right of the page, a positive z-direction can refer to a direction toward the top of the page, and a positive y-direction can refer to a direction out of the page. A negative x-direction can refer to a direction toward the left of the page, a negative z-direction can refer to a direction toward the bottom of the page, and negative y-direction can refer to a direction into the page.

The system 548 can include a computing device. The computing device can be, for example, a tablet, among other types of computing devices.

The computing device can include a rotating element 550, a housing 552 of the computing device, and can include a hinge connected to the computing device. The rotating element 550 can rotate relative to housing 552 of the computing device via the hinge. For example, rotating element 550 can be rotated relative to housing 552 via the hinge.

In some examples, rotating element 550 can be a stand. As used herein, the term "stand" can, for example, refer to a device to allow an object to be kept upright at various angles without leaning against another object or the aid of a person. For example, the stand can be used to allow the computing device illustrated in FIG. 5 to be kept upright at various angles such that a user can view a display of the computing device at the various angles. The stand (e.g., rotating element 550) can be rotated relative to the housing 552 via the hinge.

The hinge can include first bracket 532. First bracket 532 can be connected to rotating element 550. That is, first bracket 532 can be connected to the stand of the computing device. First bracket 532 can be connected to shaft 534.

The hinge can include second bracket 536. The second bracket 536 can be connected to the housing 552 of the computing device.

The hinge can include a member 538. The member 538 can be connected to the shaft 534. The member 538 can be magnetically attracted to a magnet 540. As illustrated in FIG. 5, the magnet 540 can be located in housing 552 of the computing device and can be adjacent to the shaft 534 (e.g., located in a positive x-direction from the shaft 534).

For example, as illustrated in FIG. 5, the member 538 can be between a first position and a second position relative to the magnet 540. The member 538 can experience a magnetic attraction force at various positions of the member 538, as is further described herein.

The member 538 can translate to a second position of the member 538 relative to the magnet 540 from a first position of the member 538 in response to the first bracket 532 and the shaft 534 rotating about an axis of the shaft 534 from a first rotation angle to a second rotation angle. For example, as rotating element 550 (e.g., the stand of the computing device) rotates relative to housing 552 of the computing device, the first bracket 532 and the shaft 534 can correspondingly rotate relative to second bracket 536. In other words, the stand of the computing device can rotate relative to housing 552 of the computing device in response to the first bracket 532 and the shaft 534 rotating about the axis of the shaft 534 from a first rotation angle to a second rotation angle. As a result of the rotating element 550 rotating relative to housing 552, the member 538 can translate from a first position to a second position relative to the magnet 540.

As the member 538 translates relative to the magnet 540 (e.g., in a positive x-direction, as illustrated in FIG. 4) from a first position to a second position, the magnetic attraction force between the member 538 and the magnet 540 can increase. For example, as the stand of the computing device is opened (e.g., as the rotating element 550 is rotated in a clock-wise direction), the magnetic attraction force between the member 538 and the magnet 540 can increase. As the magnetic attraction force between the member 538 and the magnet 540 increases, the force to continue rotating the rotating element 550 can increase.

The stand of the computing device can correspondingly be closed (e.g., as the rotating element 550 is rotated in a counter clock-wise direction), the magnetic attraction force between the member 538 and the magnet 540 can decrease. That is, the magnetic attraction force between the member 538 and the magnet 540 can decrease as the translational motion of the member 538 relative to the magnet 540 occurs in response to the rotation of the first bracket 532 and the shaft 534 from the second rotation angle to the first rotation angle. As the magnetic attraction force between the member 538 and the magnet 540 decreases, the force to continue rotating the rotating element 550 can decrease.

Although not shown in FIG. 5 for clarity and so as not to obscure examples of the disclosure, the computing device can include a second hinge. The second hinge can be located on an opposing side of the computing device. For example, the second hinge can be oriented in a similar manner as the hinge illustrated in FIG. 5, and be located on an opposing side of the computing device in a negative y-direction from the hinge illustrated in FIG. 5.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 100 may refer to element 102 in FIG. 1 and an analogous element may be identified by reference numeral 202 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense The above specification, examples and data provide a description of the use of the system and method of the disclosure. Since many examples can be made without departing from the spirit and scope of the system and method of the disclosure, this specification merely sets forth some of the many possible examples and implementations.

What is claimed is:

1. A hinge, comprising:
a first bracket connected to a shaft;
a second bracket connected to the first bracket;
a member connected to the shaft and magnetically attracted to a magnet at a first position, wherein the member translates relative to the magnet to a second position as the shaft rotates about an axis of the shaft; and
the magnet to generate a magnetic attraction force between the member and the magnet, wherein the magnetic attraction force is higher at the second position than the first position.

2. The hinge of claim 1, wherein the magnetic attraction force between the member and the magnet increases as the translational motion of the member relative to the magnet occurs in response to the rotation of the first bracket and the shaft from the first rotation angle to the second rotation angle.

3. The hinge of claim 1, wherein the first bracket and the shaft rotate relative to the second bracket about the axis of the shaft.

4. The hinge of claim 1, wherein the first bracket is connected to a display of a computing device.

5. The hinge of claim 4, wherein:
the second bracket is connected to a housing of the computing device; and
the display of the computing device rotates relative to the housing of the computing device in response to the first bracket and the shaft rotating about the axis of the shaft from the first rotation angle to the second rotation angle.

6. The hinge of claim 1, wherein:
the magnet is located below the second bracket; and
the member is located on a side of the second bracket.

7. The hinge of claim 1, wherein the magnet includes a pin to cause the magnet to rotate in response to the member translating relative to the magnet to the second position.

8. The hinge of claim 7, wherein the magnet is connected to two mechanisms located on opposite ends of the magnet, wherein the mechanisms resist the rotation about the pin in response to the member translating relative to the magnet to the second position.

9. A hinge, comprising:
a first bracket connected to a shaft;
a second bracket connected to the first bracket;
a member connected to the shaft and magnetically attracted to a magnet at a first position, wherein the member translates relative to the magnet to a second position in response to the first bracket and the shaft rotating about an axis of the shaft from a first rotation angle to a second rotation angle; and
the magnet to generate a magnetic attraction force between the member and the magnet that increases as the member translates relative to the magnet to the second position from the first position in response to the rotation of the first bracket and the shaft from the first rotation angle to the second rotation angle.

10. The hinge of claim 9, wherein the magnetic attraction force between the member and the magnet decreases as the translational motion of the member relative to the magnet occurs in response to the rotation of the first bracket and the shaft from the second rotation angle to the first rotation angle.

11. The hinge of claim 9, wherein:
the first bracket is connected to a stand of a computing device;
the second bracket is connected to a housing of the computing device; and
the stand of the computing device rotates relative to the housing of the computing device in response to the first bracket and the shaft rotating about the axis of the shaft from the first rotation angle to the second rotation angle.

12. The hinge of claim 9, wherein the magnet is located in a housing of the computing device and adjacent to the shaft.

13. A system, comprising:
a computing device;
a hinge connected to the computing device, wherein the hinge includes:
a first bracket connected to a shaft;
a second bracket connected to the first bracket, the second bracket connected to a housing of the computing device; and
a member connected to the shaft and magnetically attracted to a magnet at a first position of the member, wherein the member translates to a second position of the member in response to the first bracket and the shaft rotating about an axis of the shaft from a first rotation angle to a second rotation angle;
wherein a magnetic attraction force between the member and the magnet generated by the magnet increases as the member translates from the first position of the member to the second position of the member.

14. The system of claim 13, wherein the computing device comprises a rotating element that rotates relative to the housing of the computing device via the hinge.

15. The system of claim 13, wherein the system further includes a second hinge, wherein the hinges are located on opposing sides of the computing device.

* * * * *